Apr. 24, 1923. 1,453,006
E. C. DAY
LIGHTING MEANS FOR SURGICAL AND OTHER PURPOSES
Filed May 26, 1921

Emory C. Day,
INVENTOR

WITNESSES
Howard D. Orr.
F. T. Chapman.

BY E. G. Siggers
ATTORNEY

Patented Apr. 24, 1923.

1,453,006

UNITED STATES PATENT OFFICE.

EMORY C. DAY, OF LAGUNA BEACH, CALIFORNIA.

LIGHTING MEANS FOR SURGICAL AND OTHER PURPOSES.

Application filed May 26, 1921. Serial No. 472,789.

*To all whom it may concern:*

Be it known that I, EMORY C. DAY, a citizen of the United States, residing at Laguna Beach, in the county of Orange and State of California, have invented a new and useful Lighting Means for Surgical and Other Purposes, of which the following is a specification.

This invention has reference to lighting means for surgical and other purposes, and its object is to produce a lighting means which may be worn on the head to throw a beam of light along the line of vision from the lighting means toward the point to be illuminated so that the beam of light will participate in movements of the head of the observer and may be automatically maintained in such line of vision without effort on the part of the observer.

In accordance with the invention, there is provided a holder with a sight or peep hole therethrough, with means whereby the holder may be attached to the head of the observer, with the peep hole in line with one of the eyes of the observer, and the holder is provided with light-projecting means, with the light furnished by light-giving units and projecting reflectors surrounding the peep hole on the side of the holder remote from the head of the observer.

Each light-giving unit may be in the form of a miniature electric lamp bulb fixed in the holder, so far as the adjustment is concerned, and fed by conductors coming from some suitable source of current. Associated with each lamp is a reflector, preferably of parabolic character, with the reflectors grouped for simultaneous adjustment to parallelize the light rays or spread or contract them as desired.

The invention will be best understood from a consideration of the following detailed description taken in connection with the accompanying drawing forming part of this specification, with the understanding, however, that the invention is not confined to any strict conformity with the showing of the drawing but may be changed and modified so long as such changes and modifications mark no material departure from the salient features of the invention as expressed in the appended claims.

In the drawing:—

Figure 1:
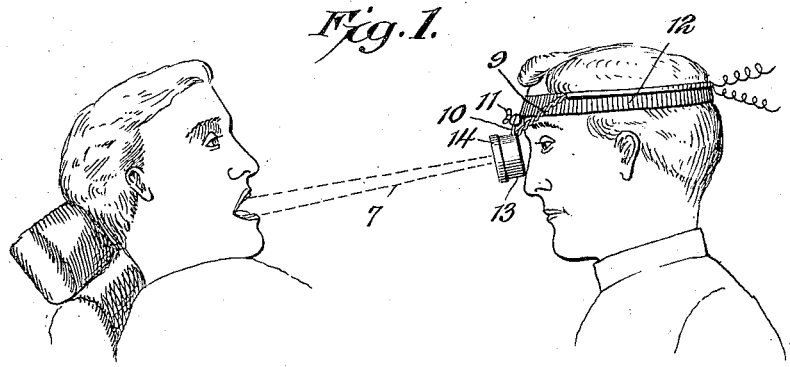
Fig. 1 is a perspective view showing one application of the invention.
Figure 2:
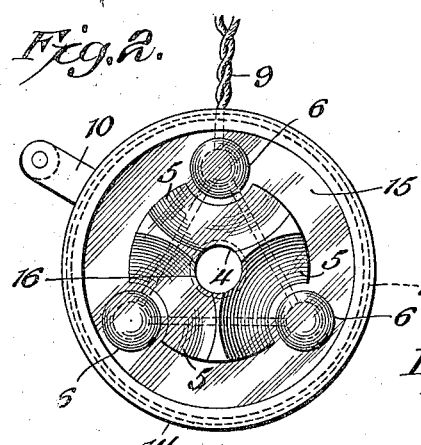
Fig. 2 is a face view of the lighting means or projector.
Figure 3:
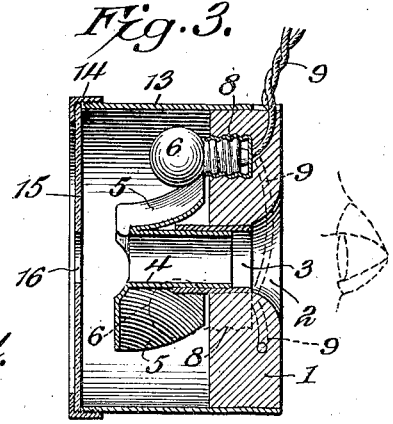
Fig. 3 is a front to rear diametric section thereof.
Figure 4:
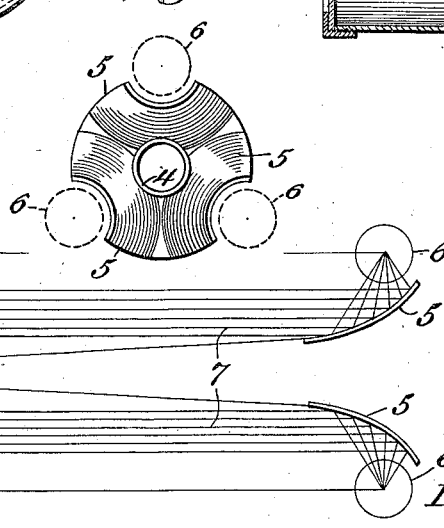
Fig. 4 is a face view of the reflectors in grouped arrangement and showing the lamps in dotted lines.

Referring to the drawing, there is shown a body member composed of a block 1 of suitable conformation and which for convenience may be in the form of an annulus of some suitable material, with an axial passage 2 preferably flaring toward the rear of the block, that is, the flare is toward that end of the passage toward the eye of the observer when the device is in use.

Figure 5:
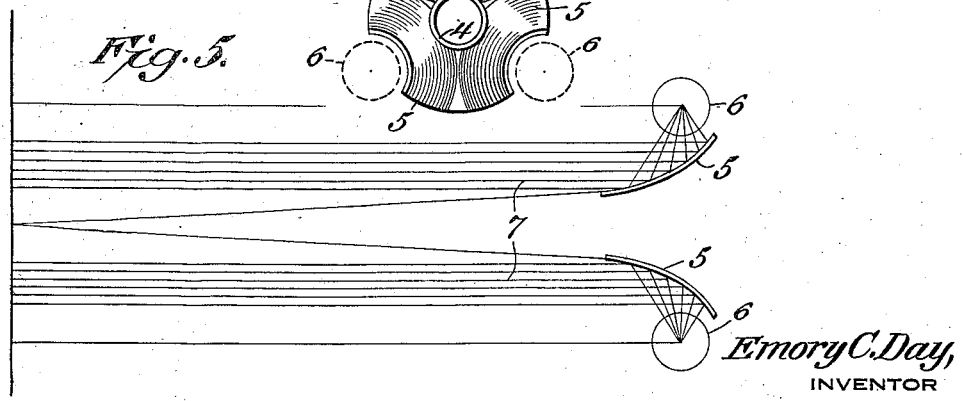
Fig. 5 is a diagram illustrating the scheme of illumination.

Fixedly lodged in the outer end of the passage 2, is a sleeve 3 which may project forwardly from the passage 2 beyond the front wall of the body member 1, and slidably fitted in the sleeve 3 is a tube 4. Fast to and grouped about the tube 4, is a series of reflectors 5 with each reflector defining the segments of a parabola, the several reflectors being set outwardly and fastened to and grouped about the tube 4. The reflectors 5 are fastened to the tube and also to each other so that the reflector group may be adjusted forwardly or rearwardly as occasion may demand. That portion of each parabolic reflector toward the body member 1 is narrow and curved so as to receive the bulb portion of an electric lamp 6, which lamp extends lengthwise of the reflector individual thereto so as to be located at about the axis of the parabolic reflectors. In one position of adjustment, the lamps may be in the focus of the reflectors, and beams of light, represented by the lines 7 in Fig. 5 are projected parallel to each other in the direction away from the front of the light-projecting device and parallel with the line of vision of the observer through the peep hole provided by the passage 2 and tube 4.

In the particular showing of the drawings, the projecting device is provided with three lamps 6 grouped in circular series about the line of vision and spaced apart equi-distantly. It is to be understood, however, that while the grouping of three lamps is usually sufficient and therefore advantageous, a greater number of lamps may be employed if occasion demands.

Each lamp 6, which may be of ordinary construction, is held in a socket 8 carried by the body 1, and the several lamps are fed by electric conductors 9 in the usual manner.

The body member 1 is provided with an arm 10 traversed by a thumb screw 11 securing the arm 10 to a head band 12 so proportioned and constructed that the body member 1 may be situated and adjusted in front of one of the eyes of the observer with the peep hole 2 in the line of vision.

Applied to the body member 1 is a casing 13, which may be of opaque material, to confine the light emitted by the lamps 6. The casing 13 is prolonged for a short distance beyond the body member 1 and has a retaining ring 14 applied to its outer end, which retaining ring serves to hold a glass pane 15 as a transparent cover for the outer end of the casing, and in order to prevent confusion of vision, the pane 15 has a centralized opening 16 in line with the tube 4.

The invention is not only adapted for surgical uses, but may be employed for mechanical uses. For the latter purpose, it may be necessary for a mechanic to provide circumscribed illumination for dark places, enabling the mechanic to see clearly deep into a cavity in a machine, in which event the invention, which is in the nature of a headlight because carried by the head of the observer, will throw a beam of light into the cavity with such beam following every movement of the observer without effort on the part of such observer. The same is true for surgical purposes where it is necessary for the surgeon to visually explore bodily cavities.

The headlight of the invention is advantageous because a relatively broad light beam may be obtained on account of the use of the parabolic reflectors arranged in a circular group, with provision made for varying the relation of the reflectors and lamps in such manner as to obtain an even field of illumination or divergent rays or condensed rays, all surrounding the line of vision.

What is claimed is:—

1. A lighting means for surgical and other purposes, comprising a body member with a centralized peep hole therethrough, a circular group of illuminating elements in the body member about the peep hole, and a circular group of reflector means also within the body member, with each reflector between the circular group of illuminating elements and the peep hole.

2. An illuminating device for application to the head of an observer opposite one of the eyes of the observer, comprising a body member with a peep hole therethrough, a circular group of reflectors adjustable lengthwise of the peephole, and a circular group of illuminating elements carried by the body member on the side of the reflectors remote from the peephole.

3. An illuminating device for application to the head of an observer, comprising a body member with a peephole therethrough in the line of vision, a circular group of parabolic reflectors mounted about the peep hole and providing a line of vision through them, and a group of electric lamp bulbs carried by the body member in surrounding relation to the reflectors whereby beams of light are projected forwardly of the headlight by the reflectors without interference with the line of vision.

4. An illuminating device for application to the head of an observer, comprising a body member with a peep hole therethrough in the line of vision, a circular group of parabolic reflectors mounted about the peep hole and providing a line of vision through them, and a group of electric lamp bulbs carried by the body member in surrounding relation to the reflectors, whereby beams of light are projected forwardly of the headlight by the reflectors, without interference with the line of vision, said body member being provided with a forwardly projecting casing and a protecting transparent cover for the front thereof.

5. In a lighting means for surgical and other purposes, a body member adapted for application to the head of an observer and provided with a peep hole through which observations may be made, and illuminating means carried by the body member in surrounding relation to the peep hole and comprising a circular series of reflectors and a like series of electric lamps exterior to the reflectors.

6. A lighting means for surgical and other purposes, comprising a body member with a peep hole axially through it for viewing the parts to be illuminated, said body member having an adjustable tube, illuminating means surrounding the peep hole at one face of the body member, and reflecting means for directing beams of light from the illuminating means, both the reflecting means and the illuminating means being arranged in surrounding relation to the line of vision through the peep hole, the reflecting means comprising a series of reflectors, each reflector defining the segment of a parabola, said reflectors being set outwardly and fastened to and grouped about said tube.

7. In a lighting means for surgical and other purposes, a group of parabolic reflector segments arranged back to back about a line of vision, and a similar group of electric lamps exterior to and associated with the reflectors, said reflectors with the lamps exterior thereto surrounding a peep hole through which a view may be obtained of a space illuminated by the lamps and reflectors, with said reflectors hiding the lamps from the line of vision through the peep hole.

8. In a lighting means for surgical and other purposes, a headlight comprising a holder with a peep hole therethrough, illuminating means on the holder, reflectors on the holder arranged to project beams of light from the illuminating means to the space to be illuminated and hiding the lamps from view through the peep hole, said reflectors comprising a group of segments of parabolic reflectors, and means for securing the holder and headlight to the head of an observer with the eye of the observer in line with the peep hole.

9. In a lighting means for surgical and other purposes, a headlight comprising a holder with a peep hole therethrough, a rigid sleeve extending from said peep hole, illuminating means on the holder, reflectors on the holder arranged to project beams of light from the illuminating means to the space to be illuminated and hiding the lamps from view through the peep hole, a tube to which said reflectors are secured, said tube being adjustably mounted on said sleeve, and means for securing the holder and headlight to the head of an observer with the eye of the observer in line with the peep hole.

In testimony that I claim the foregoing as my own, I have hereto affixed my signature in the presence of two witnesses.

EMORY C. DAY.

Witnesses:
BRAYTON S. NORTON,
JOS. R. JAHRAUS.